United States Patent [19]
Drone

[11] 3,837,449
[45] Sept. 24, 1974

[54] TRANSMISSION CONTROLLED SPRING APPLIED STEERING BRAKES

[75] Inventor: Gary A. Drone, Springfield, Ill.

[73] Assignee: Fiat-Allis Construction Machinery, Inc., Milwaukee. Wis.

[22] Filed: May 7, 1973

[21] Appl. No.: 358,136

[52] U.S. Cl............... 192/4 C, 192/13 R, 192/4 A, 188/170, 180/6.7
[51] Int. Cl...................... F16d 67/04, B60k 29/00
[58] Field of Search................... 192/4 A, 4 C, 13 R

[56] References Cited
UNITED STATES PATENTS
| | | | |
|---|---|---|---|
| 3,386,523 | 6/1968 | Ruhl................................... | 192/4 C |
| 3,458,018 | 7/1969 | Shore................................. | 192/4 C |
| 3,460,645 | 8/1969 | Brown et al....................... | 192/13 R |

*Primary Examiner*—Benjamin W. Wyche
*Attorney, Agent, or Firm*—Thomas F. Kirby; James E. Nilles

[57] ABSTRACT

The vehicle is provided with a pair of spring applied brakes which are individually controllable through hydraulic actuators acting in opposition to the springs. The brakes are individually controlled by a valve associated with the hydraulic actuators and are automatically, simultaneously applied by operation of brake pressure regulating valves which are biased by the pressure of the hydraulic control system for the forward-reverse clutches of the vehicle transmission. The vehicle brakes are applied by balancing pressure across the piston of the brake actuator. During forward or reverse travel of the vehicle, the pressure on one side of the brake actuator compresses the spring to release the brakes. When low fluid pressure is supplied as when the engine is dead, the brake actuator pressure will drop thereby permitting the springs to apply the brakes. When the engine is running and the hydraulic systems are functioning normally, the brakes are applied by the springs whenever the pressure is balanced on opposite sides of the spring loaded brake actuator. The brake pressure regulator valves cause the pressure to be balanced at reservoir pressure when the biasing pressure from the change speed transmission control drops to a low level as when in neutral or during directional shifts.

7 Claims, 1 Drawing Figure

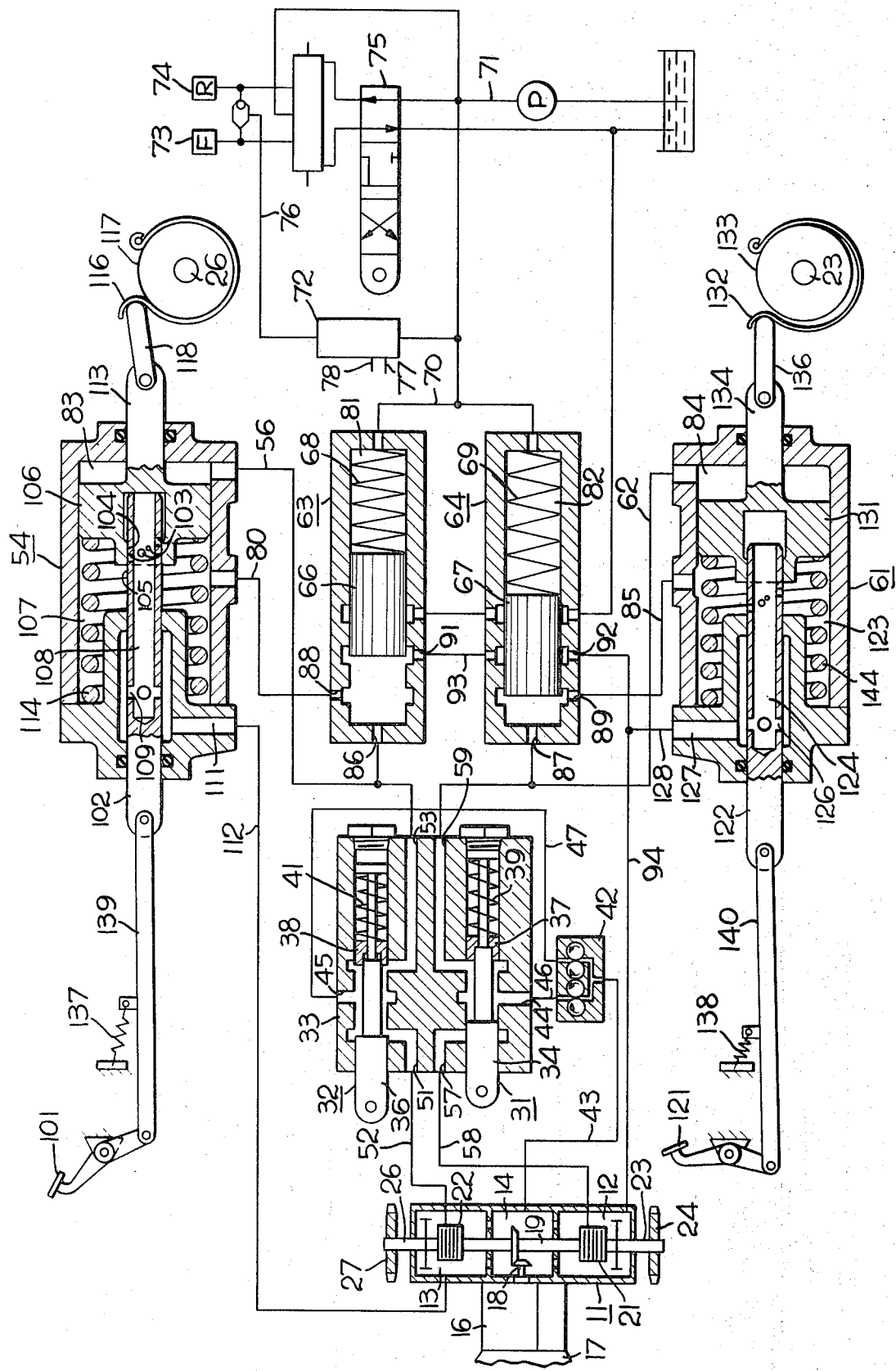

TRANSMISSION CONTROLLED SPRING APPLIED STEERING BRAKES

RELATED APPLICATIONS

The control system of this invention is related to a pending United States patent application of Gary A. Drone and Roy C. Ross for an Integrated Brake System for Crawler Tractors.

BACKGROUND OF THE INVENTION

It is difficult, if not impossible, to brake a large vehicle by manually applied force. Thus, it is common to use power operated or power assisted brakes. If power is lost, stopping the vehicle becomes a critical problem. Others have solved this problem by using spring applied brakes which are released by fluid pressure. The present invention relates to spring applied brakes which are automatically applied in neutral condition of the change speed transmission. Vehicle braking systems, wherein brakes are automatically applied in neutral, are shown in U.S. Pat. Nos. 3,604,544, 3,437,184, 3,386,523 and 3,458,018.

BRIEF SUMMARY OF THE INVENTION

A pair of spring applied brakes are provided for a vehicle such as a crawler tractor which may be hydraulically released by independent manually operated valves. The brakes are automatically applied when a directional shift is made and when the change speed transmission is in neutral. A pair of brake actuators are used wherein the piston is biased in one direction for applying the brakes by a brake operating spring and is biased in the opposite direction to release the brakes by pressure chambers of the brake actuators. In the illustrated embodiment of the invention the brake is released by applying fluid pressure to the actuator pressure chamber on the rod side of the piston and the brake is applied by applying equal fluid pressure to the opposite sides of the piston thus allowing the spring to apply the brakes. As in the related application hereinbefore mentioned, the brake pressure regulating valves are biased by pressure in a circuit of the change speed transmission control wherein a pressure drop occurs during directional shifts and when the transmission is placed in neutral.

DETAILED DESCRIPTION

Referring to the single schematic FIGURE in the attached drawing, a crawler tractor is provided with a main frame including a final drive housing 11 having a left clutch compartment 12, a right clutch compartment 13 and a bevelled gear compartment 14. A power shift change speed transmission 16 receives power to its input shaft, not shown, from an engine 17 and delivers power to its output shaft 18. The output shaft 18 includes a small bevel gear which meshes with a larger complimentary bevel gear on an intermediate drive 19 which is connected at its opposite ends to the input members of a left steering clutch 21 and a right steering clutch 22. The output member of the left steering clutch 21 is connected to a final drive shaft 23 which is nonrotatably secured to a left drive sprocket 24. Likewise, a right final drive shaft 26 is nonrotatably connected to a right sprocket 27 and the output member of the right steering clutch 22 by suitable means, not shown. The compartments 12, 13 and 14 of the final drive housing are interconnected by passages so as to serve as a fluid reservoir for the control for the steering clutches and brakes.

The steering clutches 21, 22 are of the spring loaded type and are controlled by a pair of steering clutch valves 31, 32 having a common housing 33. The steering control valves 31, 32 include control spools 34, 36 on which clutch pressure control valves in the form of sleeves 37, 38 are reciprocably mounted and biased by compression springs 39, 41 interposed between the ends of the spools 34, 36 and the sleeves 37, 38. An engine driven double pump assembly 42 draws hydraulic fluid from the bevel gear compartment 14 by way of conduit 43 and delivers pressure fluid to input ports 44, 45 of the steering control valves 31, 32 by way of conduits 46, 47. As illustrated, the right steering control valve spool 36 has been shifted to a clutch disengaging position in which input port 45 is placed in fluid communication with a clutch port 51 which is connected to the right steering clutch 22 by a conduit 52. The pressure supplied to the right steering clutch 22 is regulated by the shiftable sleeve 38 which moves to the right when the clutch pressure reaches a desired clutch disengaging pressure to pass fluid to a brake port 53 which is connected to the rod end of a right brake actuator 54 by a conduit 56. The left steering clutch valve spool 34 is shown in its clutch engaged position in which its clutch port 57 and a clutch conduit 58 are not supplied fluid pressure and fluid delivered to the input port 44 passes to a brake port 59 and thence, to a left brake actuator 61 by way of a conduit 62. The clutch pressure regulating valve (sleeve 37) abuts a shoulder of spool 34 and has no effect on fluid flow to the brake port 59.

A pair of brake pressure regulating valves 63, 64 include shiftable flow control elements 66, 67 which are biased by weak compression springs 68, 69. Additionally, the flow control elements 66, 67 are biased by fluid actuators formed by the ends of the elements 66, 67 and chambers 81, 82. The chambers 81, 82 are connected by a passage or conduit 70 with a supply circuit 71 of the control system for the power shift transmission 16. The pressure in the supply circuit 71 is regulated by a transmission pressure regulator valve 72. The control system for forward and reverse clutches 73, 74 of the power shift transmission 16 is the same as that shown in the copending patent application of Gary A. Drone and Roy C. Ross for an Integrated Brake System for Crawler Tractors. As illustrated, the pilot valve 75 of the transmission control system is shifted from its neutral position to a forward position wherein fluid pressure is directed to a forward clutch 73. The transmission pressure regulator valve 72 is biased by the pressure delivered to the forward clutch 73 by way of conduit 76. This restricts flow to the torque converter and lubricating outlets 77, 78 of the regulating valve 72 thereby maintaining a relatively high pressure level in supply circuit 71. Thus, in the illustration, relatively high hydraulic pressure in chambers 81, 82 of the valves 63, 64 biases the flow control elements 66, 67 to the left thereby insuring a relatively high pressure level in the chambers 83, 84 of the brake actuators 54, 61. The brake pressure regulating valves 63, 64 are disposed in controlling relation to conduits 80, 85 which are in parallel relation to conduits 56, 62. The brake pressure regulating valves 63, 64 have inlets 86, 87, actuator ports 88, 89 and outlets 91, 92. The outlets 91, 92 are cross-connected by a passage 93 and are connected to the final drive housing by a conduit 94.

As illustrated, the operator has depressed a brake pedal 101 shifting a brake valve control member 102 rearwardly whereby its openings 103 are blocked from communication with a pressure chamber 107 by a cylindrical sealing surface 104 of a piston 106 which is in sealing engagement with the complimentary cylindrical sealing face 105 of the valve member 102. Thus, fluid supplied through conduit 80 to a pressure chamber 107 of the brake actuator 54 is prevented from flowing to the reservoir in the final drive housing 11 through passage means including a central passage 108, a cross-passage 109, a reservoir port 111 and an exhaust conduit 112. Accordingly, pressure will build up in the chamber 107 to the same pressure as the fluid in the chamber 83 and since the diameter of the valve 102 is approximately the same as that of a piston rod 113 of the piston 106 the hydraulic forces acting upon the piston 106 will be virtually balanced. This allows the brake actuating spring 114 to move the piston 106 to the right to apply the right brake by tightening the brake band 116 about a brake drum 117 secured as by welding to drive shaft 26. A link 118 serves to interconnect the brake band 116 and the rod 113 of the piston 106. The flow control element 66 of the brake pressure regulator valve 63 will serve as a relief valve by moving rearwardly to the position shown wherein high pressure relief flow is permitted to pass to the reservoir port 91. A left brake pedal 121 is not depressed and thus, a flow control member 122 for the left brake actuator 61 will be in its illustrated open position wherein relief flow from the left brake regulating valve 64 will pass to the reservoir conduit 94 by way of the conduit 85, chamber 123, internal passages 124, 126 in the flow control member 122, a reservoir port 127 and an exhaust passage 128. The pressure fluid delivered to the chamber 84 by way of conduit 62 will be at a sufficiently high level due to the action of the hydraulic biasing of flow control element 67 by the pressure in the chamber 82 to insure that the piston 131 of the left brake actuator 61 is moved to the left as illustrated, thus, allowing the left brake band 132 to be disengaged from the left brake drum 133 which is attached to sprocket 24 by way of shaft 23. The piston 131 is operatively conected to the brake band 132 of the left brake by way of a piston rod 134 and a link 136. A pair of return springs 137, 138 connected to the brake valve control links 139, 140 bias the brake valve flow control members 102, 122 toward their open positions, in which member 122 is illustrated.

From the foregoing description it is seen that the vehicle brakes may be engaged through operation of individual manual controls including brake pedals 101, 121 which operate valve members 102, 122 associated with the pistons 106, 131 of the spring loaded brake actuators 54, 61. The brake valve members when moved from their open positions to their closed positions will cause the pressure to be balanced on opposite sides of the actuator pistons 106, 131 thereby allowing the springs 114, 144 to move the pistons to the right to apply the brakes. The manually operated control for the brakes is of the follow-up type in that as the piston moves to the right to apply the brake the pedal must be further depressed to maintain the brake valve closed. This provides the operator with a "feel" of the braking.

The pressure is balanced on opposite sides of the brake actuator pistons when there is a pressure failure in the control system, thus, providing adequate braking for large vehicles which are difficult to brake by manual braking force. A pressure drop in the power shift transmission control during a direction change and when placed in neutral, provides automatic braking in neutral to reduce the loading and wear on the forward and reverse clutches. The automatic braking is effected by the brake pressure regulator valve moving to an open position allowing pressure fluid from the steering valves to pass to reservoir. The pressure chambers of the hydraulic actuators 54, 61 are placed in communication with the reservoir and the pressures on opposite sides of the brake actuator pistons are virtually balanced. In this condition, there is little or no opposing force on the brake springs 114, 144 which accordingly will move the piston to the right and apply the brakes.

It will be noted that the brake pressure regulating valves not only serve to establish the pressure level for disengaging the brakes but also serve as relief valves with two positions of relief. The first position of relief is that occupied in the drawings by flow control element 67 wherein only the chamber 84 on the rod side of actuator 61 is pressurized and flow to brake port 89 passes to reservoir through the opposite side of the actuator. The second position of relief is that in which flow control element 66 is shown in the drawings wherein both chambers 83 and 107 of the actuator 54 are pressurized and relief flow to reservoir is by way of reservoir port 91. When the pressure in chambers 81, 82 is at a low level, the pressure in the brake actuator chambers 83, 84 will drop to a relatively low level thereby permitting the springs 114, 144 to apply the brakes. In this condition the fluid will pass to reservoir at a relatively low pressure with the flow control elements 66, 67 being disposed in their first relief position.

One advantage of this integrated braking system is that relatively few parts are required thereby reducing initial cost and minimizing servicing and replacement costs. Also, the follow-up feature gives the operator "feel" of the application of the brakes.

The embodiments of the invention in which an exclusive property or privilege is claimed are defined as follows:

1. In a crawler tractor having a power shift transmission with forward and reverse clutches, right and left final drive sprockets connected to the transmission output through right and left hydraulically controlled steering clutches, respectively, and right and left brakes operatively associated with said right and left sprockets, respectively, hydraulic control means comprising:

a first control system for said steering clutches and brakes including
right and left brake actuators each having,
a cylinder,
a piston having a piston rod extending from an end of said cylinder,
a first pressure chamber on the rod end of said cylinder, and
a second pressure chamber on the opposite end of said cylinder,
means connecting said rods to said right and left brakes, respectively, a pair of springs operatively associated with said pistons, respectively, urging the latter in a direction effecting engagement of said brakes, right and left clutch control valves, each having a control element shiftable between clutch engaged and clutch disengaged positions and each having a clutch port, a supply port and a brake port, a pair of conduits operatively connecting said clutch ports of said right and left clutch valves to said right and left clutches, respectively, a reservoir, pump means connected to said reservoir and to each of said supply ports, a first pair of brake actuator conduits connecting said brake ports of said right and left clutch control valves to said first pressure chambers of said right and left brake actuators, respectively, a second pair of brake actuator conduits interconnecting said brake ports and said second pressure chambers, respectively, a brake pressure regulating valve in each of said second pair of brake actuator conduits having
an inlet,
a brake actuator port,
an outlet connected to said reservoir,
a shiftable flow control element having a first position wherein said inlet is blocked and flow in the associated one of said second pair of brake actuator conduits is prevented, a second position wherein said inlet and said brake actuator port are in communication and flow is permitted in said associated one of said second pair of brake actuator conduits, and a third position in which said inlet, brake actuator port and outlet are in communication, and
fluid actuator means operable on pressurization to bias said flow control elements toward their first positions, passage means between each of said second pressure chambers and said reservoir and an individually controllable and manually operated brake valve in each of said passage means having an open position wherein said second chambers are connected to said reservoir and a closed position wherein said second chambers are blocked from communication with said reservoir, a second control system for said power shift transmission for establishing forward, reverse and neutral conditions and having a circuit with fluid at a predetermined low pressure when said transmission is in said neutral condition and at a predetermined high pressure when said transmission is in either of said forward and reverse conditions, and conduit means connecting said circuit to said fluid actuator means, whereby said brakes are engaged in said neutral condition of said transmission.

2. The control means set forth in claim 1 wherein said springs are disposed in said second chambers, respectively, and are in thrust transmitting engagement with said pistons, respectively.

3. The control means of claim 1 wherein each of said pistons includes a sealing surface and each of said brake valves includes a sealing face complimentary to and engageable with an associated one of said sealing surfaces which on engagement therewith prevents escape of fluid from the associated one of said second chambers to said reservoir.

4. The control means of claim 1 wherein a clutch pressure regulator valve is operatively associated with each of said clutch control valves whereby, when the latter's control element is in its clutch disengaged position, fluid will flow to said brake port when pressure at said clutch port reaches a predetermined value.

5. In a vehicle having a power shift transmission and a brake, the combination comprising:
a first control system for said brake including
a brake actuator having a cylinder, a piston in said cylinder having a rod extending from an end of said cylinder and connected to said brake, a first pressure chamber in the rod end of said cylinder and a second pressure chamber in the other end of said cylinder,
a reservoir,
reservoir passage means interconnecting said second chamber and said reservoir,
a manually operable brake valve operatively associated with said reservoir passage means and shiftable between open and closed positions wherein flow in said reservoir passage means is permitted and prevented, respectively,
a spring operatively associated with said piston urging the rod thereon to extend from said cylinder to cause said brake to be applied,
pump means having an inlet connected to said reservoir and having an outlet,
a first brake conduit connecting said outlet to said first pressure chamber,
a second brake conduit connected to said outlet and to said second pressure chamber,
a brake pressure regulating valve in said second brake conduit including
an inlet port,
a brake port,
a reservoir port connected to said reservoir,
a shiftable flow control element having a first position closing said inlet port wherein flow in said second brake conduit is prevented, a second position in which flow in said second brake conduit is permitted by way of said inlet port and said brake port, and a third position in which said first and second chambers are connected to said reservoir, and
fluid actuator means operable on pressurization to bias said flow control element toward its first position,
a second control system for said power shift transmission including
a transmission control valve for effecting neutral, forward and reverse conditions of transmission adjustment, and
a circuit having a high pressure level when said transmission is in either of its forward and reverse conditions and a low pressure level when said transmission is in its neutral condition, and conduit means connecting said circuit to said fluid actuator means, said brake being applied when said transmission is in its neutral condition and said first pressure chamber being pressurized to a relatively high pressure level when said transmission is in either of its forward or reverse conditions.

6. The structure of claim 5 wherein said piston includes a sealing surface and said brake valve includes a shiftable flow control member having a complimentary sealing face adapted for sealing engagement with said sealing surface.

7. The structure of claim 6 wherein said spring is disposed in said second chamber of said actuator in thrust transmitting engagement with said piston.

* * * * *